Jan. 1, 1963 C. H. BRUMLEY 3,071,037
RATIO MEASURING SPECTROPHOTOMETER
Filed Sept. 22, 1958 3 Sheets-Sheet 1
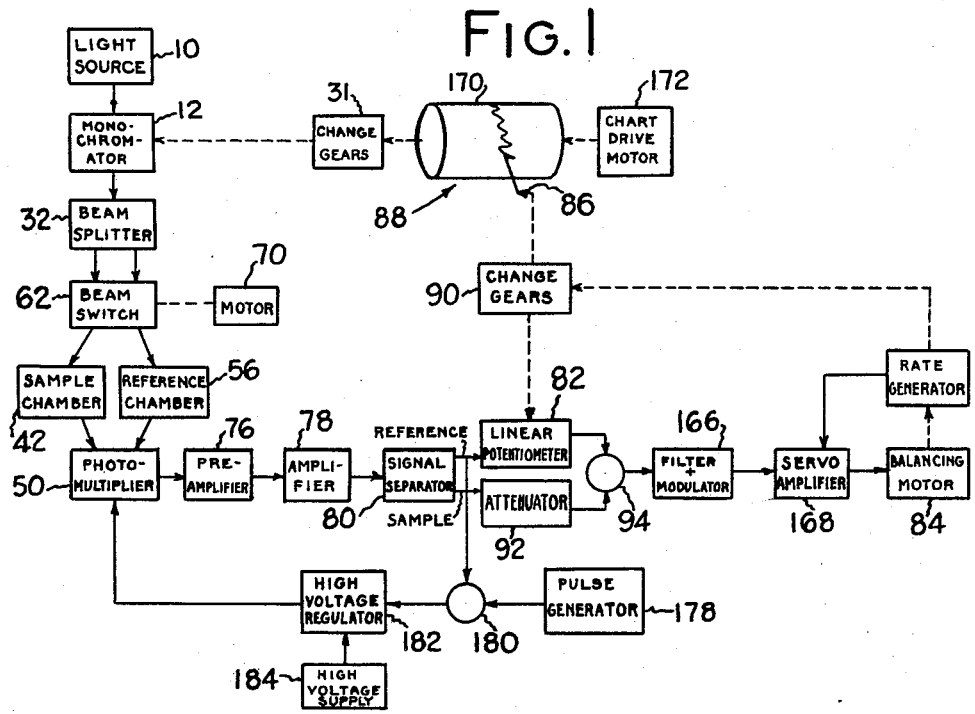
FIG. 1
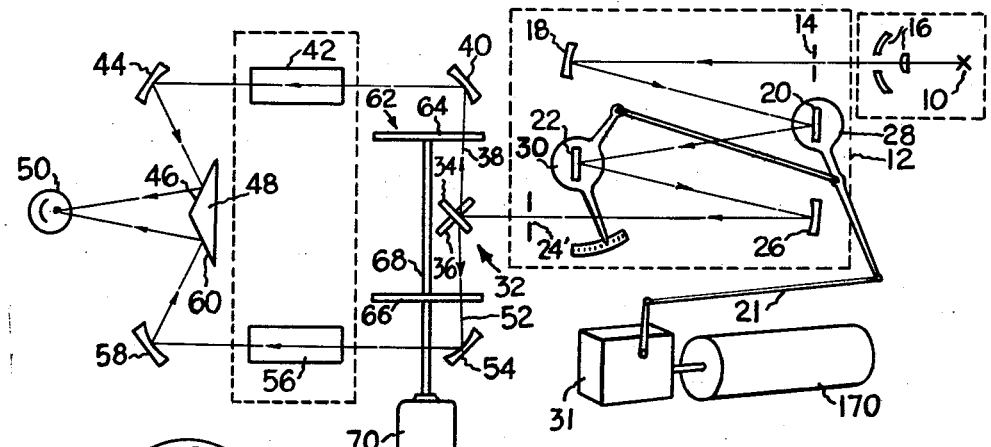
FIG. 2
FIG. 3
INVENTOR.
CORWIN H. BRUMLEY
BY
ATTORNEYS

INVENTOR.
CORWIN H. BRUMLEY

United States Patent Office 3,071,037
Patented Jan. 1, 1963

3,071,037
RATIO MEASURING SPECTROPHOTOMETER
Corwin H. Brumley, Penfield, N.Y., assignor to Bausch & Lomb Incorporated, a corporation of New York
Filed Sept. 22, 1958, Ser. No. 762,403
6 Claims. (Cl. 88—14)

This invention relates generally to spectrometers such as are commonly utilized to measure transmission in the ultraviolet region of the spectrum and transmission and reflectance in the visible wave length range of the spectrum. More specifically, the invention takes the form of an improvement in the circiut arrangement for comparing the intensities of two radiation beams which are made to fall upon a single photosensitive element.

The present invention is combined with a single source of radiation, which for present illustration may be a tungsten, hydrogen, xenon, or a mercury lamp depending upon what range of the spectrum is being utilized and the optical characteristic under study. A monochromator is provided for isolating a narrow and fixed band pass and includes a wave length device for causing continuous scanning of the spectrum at a suitable rate. The radiation emanating from the monochromator is split and directed to a pair of cells one of which contains a sample specimen and the other a reference specimen. The split beams are transformed into two corresponding and alternating series or trains of pulses by a beam switch interposed the beam splitter and the two cells, each of such trains having cycles consisting of 90° of illumination and 270° of darkness and being 180° out of phase with respect to the other train of pulses.

A photosensitive device in the form of a photomultiplier senses the alternating trains of pulse radiation falling thereon and generates a composite signal of alternate pulses corresponding to the intensity of light transmitted through the sample and reference specimens, which signal will necessarily comprise a component corresponding to each of the trains of pulses. This signal is amplified and then directed to a pair of identical channels each of which receives and amplifies the composite signal. A pulse separator in the form of a chopper is connected at the output of the channels and separates the reference pulses leaving one channel and the sample pulses leaving the other channel. The separated signals are then applied to a capacitor in a difference detection circuit in a manner such that the capacitor is charged from one side with one of the signals and from the other side with the other signal. These output signals are alternately applied to their respective sides of the capacitor whereupon the difference between the sample and reference pulses is integrated so that the result is a D.C. voltage signal proportional to the difference in the pulse heights. The resultant signal is in effect a measure of the difference between the series of pulses and may be utilized to energize and control a recording system for recording the ratio of the pulse heights in terms of transmission or absorption of the sample as the case may be.

A novel circuit arrangement is provided which compensates for the extreme variation of photomultipler sensitivity as a function of wave length and is accomplished by varying the sensitivity of the electronic systems accordingly. The high voltage supplied to the photomultiplier is varied such that the reference pulse height is maintained at a constant height throughout the wave length range.

It, is therefore, an object of the invention to provide an improved signal comparison circuit for a spectrophotometer where in the sample and reference signals are directed alternately to either side of a capacitor wherein the difference signal indicative of the difference in pulse heights of the sample and reference signals is derived for recording purposes.

Another object of the invention is to provide a novel circuit arrangement for maintaining the height of the reference pulse signal at a constant while the same is being generated at the photomultiplier.

Other objects and advantages will become apparent from the following description taken in conjunction with the accompanying drawing, wherein:

FIG. 1 is a schematic diagram of a spectrophotometer employing the principles of the present invention;

FIG. 2 is a diagrammatic plan view of the various optical elements utilized in the spectrophotometer of FIG. 1;

FIG. 3 is a perspective view of the light beam chopper used in the present invention;

Figure 4:
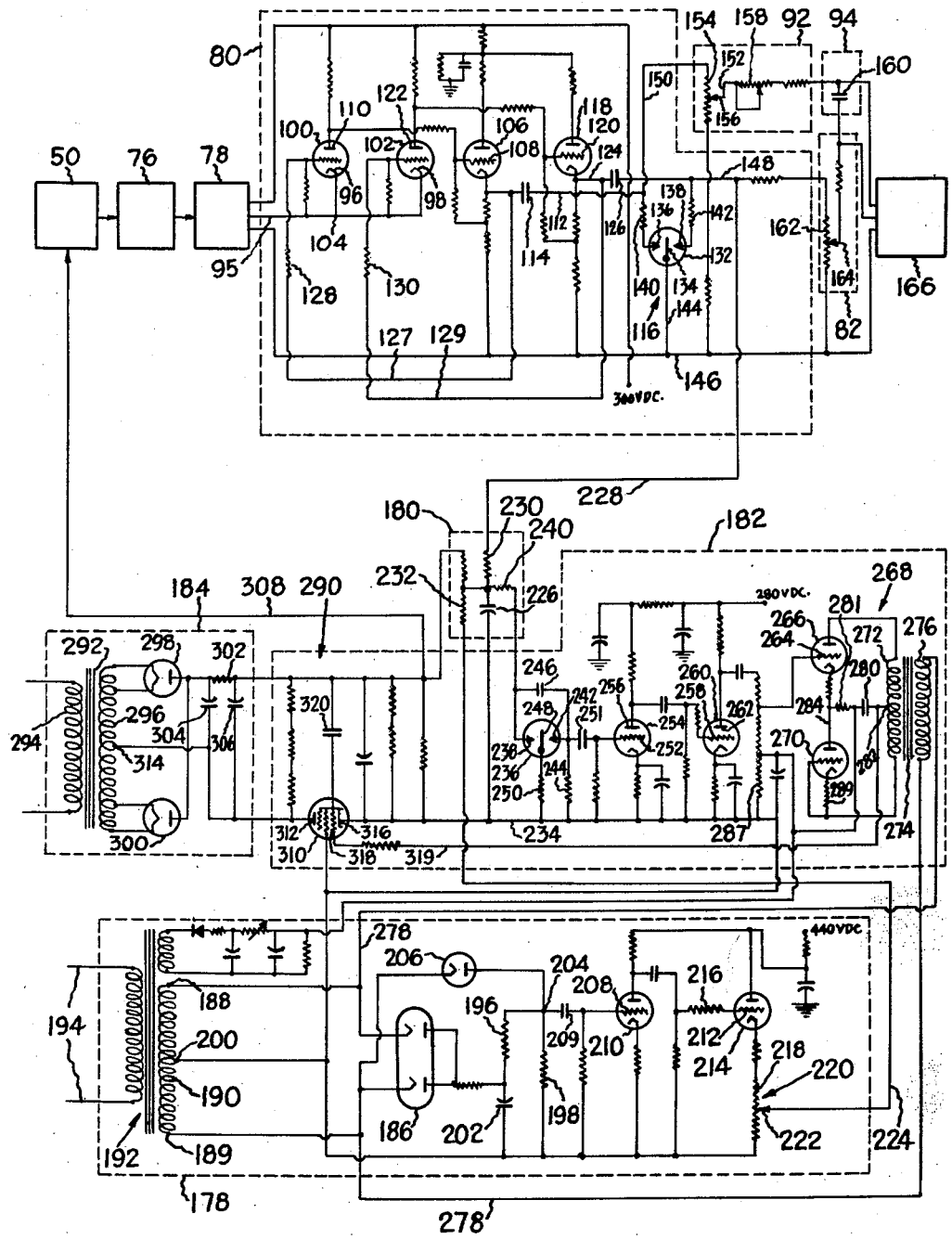
FIG. 4 is a schematic diagram of the signal separator and the pulse ratio comparing circuit together with a high voltage regulator circuit for controlling the input voltage to the photomultiplier of the present invention.

Referring to the drawings and more particularly to FIGS. 1 and 2, a source of light 10 is shown as casting a beam of light into a monochromator 12 wherein the spectrum, or a portion thereof, may be scanned and radiation, of a continuously varying wave length of the spectrum or portion thereof, may be caused to be emitted from the monochromator. The source 10 may be of any suitable type such as a hydrogen arc lamp in the event the ultraviolet portion of the spectrum is to be utilized or a tungsten lamp if the visible portion of the spectrum is desired.

As shown in FIG. 2, the light rays from the light source 10 are brought to a focus on the entrance slit 14 of the monochromator 12 by a condenser mirror system 16. The light passing through the slit falls upon and is collimated by a spherical mirror 18 which directs the parallel light rays reflected therefrom upon a first reflection grating 20 whereby the light rays of a narrow band pass width are diffracted therefrom. In order to increase dispersion and reduce scattered light, a second reflecting grating 22 is interposed in the path of the rays diffracted from the grating 20. From the second grating, the light ray beam is focused upon an exit slit 24 by a condenser mirror 26. The gratings 20 and 22 are mounted upon turntables 28, 30, respectively, and both are adapted to be rotated in unison by a suitable linkage 21 and drive system 31 from a recorder drum, as will be described hereinafter. The rotation of the gratings 20, 22 permits scanning of the spectrum or portion thereof in use for directing a beam of radiation of varying wave length upon the exit slit 24. Light passing through the slit 24 falls upon a beam splitter 32 which takes the form of a pair of superposed mirrors 34, 36 the lower one of which reflects the lower portion of the radiation passing through the slit 24 and the upper one of which reflects the upper portion of the radiation. The reflected beam 38 from the upper mirror 34 is itself reflected by a spherical mirror 40 which directs the beam 38 through a cell 42 containing the sample specimen to be studied and then to another spherical mirror 44 where the beam is again reflected and directed to a plano mirror surface 46 of a prism 48. Light reflected from the surface 46 falls upon a photosensitive device 50 which takes the form of a photomultiplier tube. Similarly, the lower mirror 36 of the beam splitter 32 reflects the lower portion of the radiation beam passing through the exit slit 24 and, for purposes of illustration, the beam so reflected by the mirror 36 is identified by the numeral 52. The beam 52 follows a path symmetrical with that of the beam 38 and is reflected by a spherical mirror 54 which directs the beam through a cell 56 containing a standard or reference specimen and then to another spherical mirror 58 where the beam is again reflected and directed to another plano surface 60 of the prism 48. Light reflected from the surface 60 falls upon the photomultiplier device 50 at approximately the same point as does the beam 38.

Means are provided for permitting the photomultiplier 50 to view the light passing into the sample cell 42 alternately with the light passing through the reference compartment 56 and, to this end, a beam switch generally indicated by the reference numeral 62 is interposed in the path of the beams 38 and 52 after they are reflected by the mirrors 34, 36, respectively. The beam switch 62 comprises a pair of discs 64, 66 mounted one on each of the ends of a common shaft 68 which is driven by a synchronous motor 70. The disc 64 is formed with an arcuate slot 72 (see FIG. 3) extending for an arc of 90° and is adapted to chop the beam 38 before the same enters the sample cell 42. The disc 66 is also formed with a slot 74 extending for an arc of 90° and is adapted to chop the beam 52 before the same enters the reference cell 56. The slots 72, 74 are diametrically opposed or spaced 180° with respect to the axis of the common shaft 68 and are rotated at a constant speed in order to cause alternate trains of pulses of light to fall upon the photomultiplier, one train of pulses being indicative of the characteristics of the sample specimen and the other train of pulses being indicative of the characteristics of the reference specimens.

The pulses of one train are alternately spaced with the pulses of the other train, are of equal duration and are equally spaced therefrom. These pulses are 90° wide and the spaces therebetween are also of 90° width since the slots 72, 74 are so related to one another that in each revolution of the shaft 68 light reaching the photomultiplier 50 has first passed through one specimen cell for a quarter turn, then through neither cell for a quarter turn, then through the other specimen cell for a quarter turn and then through neither cell for the last quarter turn.

The rotational speed of the discs 64, 66 is set at 3600 r.p.m. and since the motor 70 is of the synchronous type, the frequency at which a slot in one of the discs is open relative to its respective beam will be equal to line voltage frequency. In the present invention, the line voltage frequency is in phase with the pulse intensity frequency for the reference specimen and 180° out of phase with the pulse intensity frequency of the sample specimen.

Figure 5:
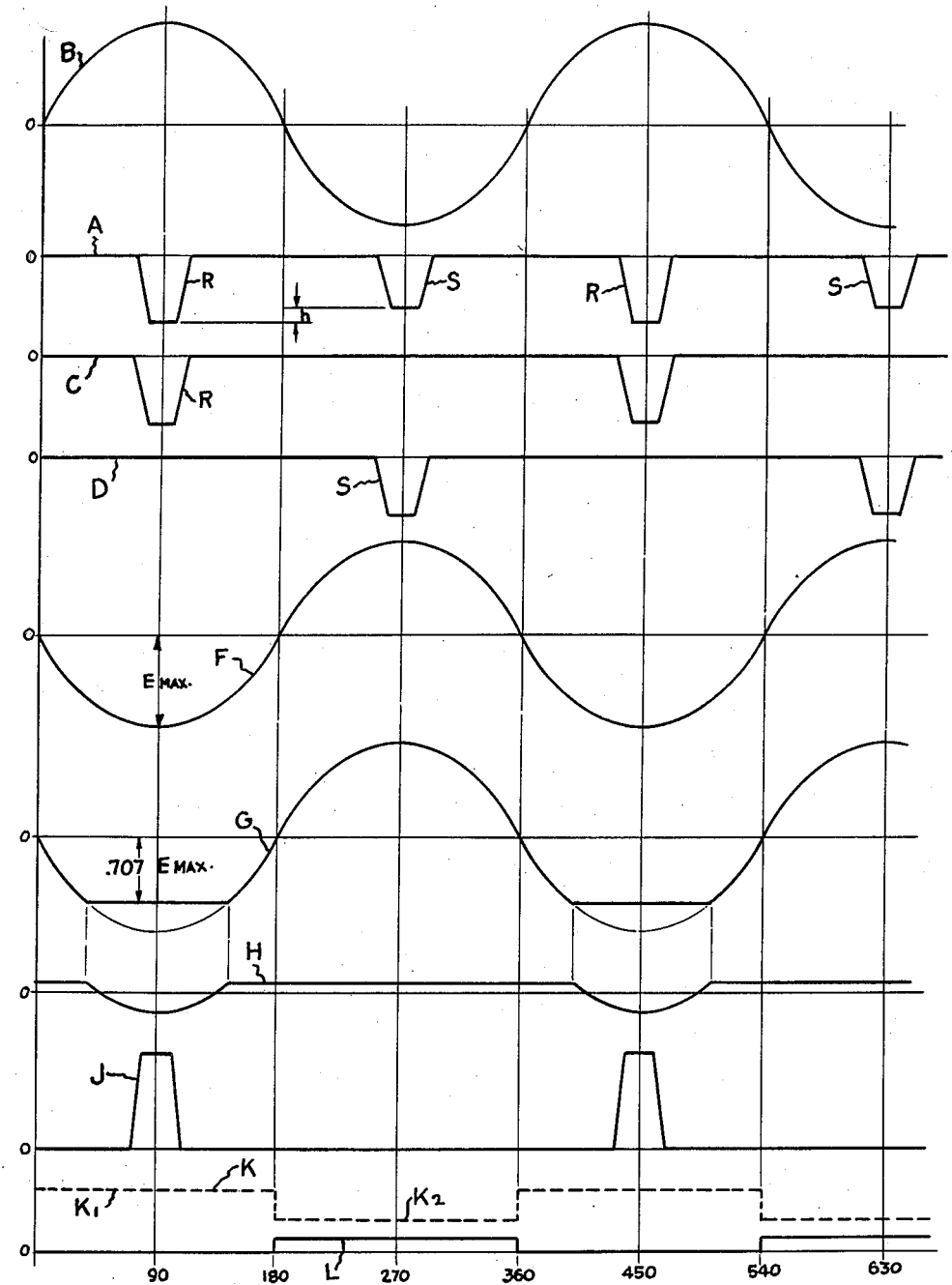
FIG. 5 is a diagram illustrating various wave forms of signals utilized in the present invention.

Light in the form of two trains of radiation pulses falls upon the photomultiplier 50 and produces trains of current pulses corresponding with the radiation pulses. In FIG. 5, the composite wave form for this current is shown as A and is compared with the line voltage B. It will be noted that the high pulses R correspond to the radiation pulses passing through the reference and the low pulses S correspond to the radiation pulses passing through the sample. Since the intensity of the radiation passing through the sample is less than that passing through the reference, the current produced thereby will be less than the current produced by the reference. This difference in intensities results in a difference in heights of the resultant current wave form and in FIG. 5 is indicated at $h$.

As shown schematically in FIG. 1, the output signal current of the photomultiplier 50 is raised to a suitable level in a preamplifier 76, amplified by amplifier 78 and conducted into a signal separator circuit 80, wherein the composite signal from the photomultiplier, which is indicative of the intensities of both the sample and reference specimens, is split into its two constituent trains of pulses. A portion of this reference signal is applied across a reference pulse attenuator 82 which is in the form of a linear potentiometer. The linear potentiometer 82 is coupled mechanically to a balancing motor 84 and a pen 86 of a recorder mechanism generally indicated by the reference numeral 88 and which is driven by the motor 84. A suitable gear box 90 having provision for inserting spiral or circular gears for the pen drive is interposed between the motor and the pen.

The sample pulse is applied across an attenuator 92. A portion of the reference pulse from the potentiometer and a portion of the sample pulse from the attenuator are compared in a difference detection circuit 94 and the resultant signal, known as the error signal, may be amplified and utilized to energize the recorder 88 in order to record the ratio or percentage of transmission of the sample specimen through the wave length range being utilized.

The above outline for the production of the error signal will now be discussed in detail and for this, reference is made to FIG. 4. The output conductor 95 of the amplifier 78 is direct-coupled to the cathodes 96, 98 of two tubes 100, 102, respectively, of the signal separator circuit 80. This output is divided or shunted at point 104 into two identical circuits for reducing the impedance of the signals therein, and these circuits, for purposes of illustration, are denoted as channels. While the signal entering and being affected by each of the channels will be the same, that is, the signal will be composite of the influence caused by the sample and reference specimens, the channel which includes the tube 100 will be designated the sample channel and the channel which includes the tube 102 will be designated the reference channel. The purpose for these designations will become apparent hereinafter.

The sample channel also includes a tube 106 having a grid 108 which is resistance-coupled to the plate 110 of the tube 100. Actually, tube 100 is a buffer amplifier for isolating the tube 106 from the preceding stages of the amplifier 78 and the preamplifier 76. The tube 106 is a cathode follower whose signal output is coupled by a conductor 112 through a capacitor 114 to a pulse separator circuit generally indicated by the reference numeral 116. The reference channel, which includes the tube 102, is also provided with a cathode follower 118 having a grid 120 resistance-coupled to the plate 122 of the tube 102. A conductor 124 is connected to the tube 118 in order to couple the output signal thereof to the pulse separator circuit 116 through a capacitor 126. The output impedance of the cathode follower 106 is reduced to a low value by negative feedback of the output signal to the grid of the tube 100 through a conductor 127 and a resistor 128. Similarly, the output of the cathode follower 118 is fed back to the grid of the tube 102 through a conductor 129 and a resistor 130.

The pulse separator circuit 116 includes a synchronous chopper 132 having a switch element 134 which is adapted to engage either of two stationary contacts 136, 138. A grounding resistor 140 is connected between the contact 136 and the conductor 112 of the sample channel and a similar grounding resistor 142 is connected between the contact 138 and the conductor 124 of the reference channel. Pulse separation is accomplished by alternately switching the two pulse signals, one from each of the channels, to ground through the resistors 140, 142, respectively. These resistors have very low ohmic value, say on the order of one ohm, so that effectively alternate pulses of the pulse outputs are short-circuited to ground. The switch element 134 is connected by a conductor 144 to the ground lead 146 for the signal separator and the amplifier and photomultiplier circuits. It is important to note that the two pulse trains or series which reach the chopper 132 are identical and that each contains both the reference and the sample pulses. Switching action of the element 134 between the contacts 136, 138 is related in phase to the line voltage, that is, 60 cycles per second, in the same sense as the optical beam switch 62 and as previously stated, the reference pulses are in phase with the line voltage.

In the event the element 134 is in engagement with the sample contact 136, the sample pulses which are conducted through the sample channel employing the tubes 100, 106 are grounded and the reference pulses, being conveyed through the conductor 124 from the reference channel employing the tubes 102, 118, will be conducted by a conductor 148 to the linear potentiometer 82. When the element 134 is in engagement with the reference contact 138, the reference pulses which are conducted through the reference channel are grounded and the sample pulses which are being conveyed through the conductor 112 from the sample channel will be conducted by a conductor 150 to the attenuator circuit 92. The purpose, then, of the signal separator is to remove the sample pulses from entering the circuit to the potentiometer 82 which is reserved for the reference pulses and to remove the reference pulses from entering the circuit to the attenuator circuit 92 which is reserved for the sample pulses. In FIG. 5, the reference pulse wave form in the conductor 148 is shown at C and the sample pulse wave form in the conductor 150 is shown at D. The purpose of the two channel system is to eliminate any influence upon one of the composite signals in one of the channels while the other composite signal in the other channel is being worked upon by the signal separator 132.

The attenuator 92 includes a potentiometer 152 having its resistance element 154 connected between the sample conductor 150 and ground 146. A slide wire 156 of the potentiometer is connected through a variable resistor 158 to one side of a capacitor 160 of the difference detection circuit 94. The attenuator 92 attenuates the sample signal in such a way as to establish the absorption range of the recorder and the means for calibrating the recorder is accomplished by the potentiometer 152 and the variable resistor 158. The potentiometer 152 and the resistor 158 may be varied in order to raise or lower the level of the sample signal at this point to coincide with the reference signal when both of the cells 42, 56 contain the same specimens, such for example, as the reference specimens. The attenuator 92 will in effect insure that the signals leaving the same will have been corrected for any optical influence upon the sample specimen other than the desired characteristic to be measured.

The reference pulse attenuator or linear potentiometer circuit 82 includes a potentiometer having a resistance element 162 connected between the reference conductor 148 and ground 146. A slide wire 164 for the element 162 is connected to the other side of the capacitor 160 and is mechanically coupled to the pen 86 and the balancing motor 84 thus making the potentiometer 82 a self-balancing circuit as will appear hereinafter.

With the attenuator 92 connected to the sample conductor 150 and the linear potentiometer or reference pulse attenuator 82 connected to the reference conductor 148 as outlined above, it will be apparent that the respective signals will alternately charge the capacitor 160. When the reference pulse arrives at the capacitor, the same is charged to a D.C. level proportional to the reference pulse height. The capacitor retains this charge until the sample pulse arrives whereupon the capacitor is discharged to a new D.C. level. The amount the capacitor 160 is discharged is proportional to the sample pulse height and the D.C. error or difference voltage developed across the capacitor 160 is proportional to the difference $h$ in pulse heights. This D.C. error voltage is then filtered and modulated by the filter and modulator 166 (see FIG. 1), and amplified in a servo-amplifier 168. The output signal of the servo-amplifier drives the balancing motor 84 which in turn moves the pen 86. Simultaneously, the slide wire 164 of the potentiometer 82 is driven by the motor 84 in the direction that attenuates the reference pulse to reduce the D.C. error voltage across the capacitor 160 to zero. This reduction of the error or difference voltage to zero is accomplished by the attenuation of the reference pulse signal before the same is impressed upon the capacitor 160. The slide wire is moved by the balancing motor 84 to attenuate the reference pulses to equate the same to the sample pulse. In the event the sample pulses reaching the capacitor 160 have a smaller amplitude than the reference pulses such as shown in FIG. 5, curves C and D, the slide wire will be moved to decrease the amplitude of the reference pulses impressed upon the capacitor 160 to a value equal to amplitude of the sample pulses. Conversely, if the sample pulses have greater amplitude than the previous instantaneous value of the amplitude of the attenuated reference pulse, the slide wire will be moved, upon recording of the new value of the sample pulse, to increase the amplitude of the reference pulses. This continuous and instantaneous attenuation of the reference pulses as the sample pulses vary in accordance with wave length scanning of the monochromator 12 tends to maintain the error voltage across the capacitor 160 at zero. When the D.C. error voltage is zero, the position of the slide wire 164 and thus the position of the recording pen 86, corresponds to the ratio of the sample and attenuated reference pulse heights.

A recording drum 170 for the recorder 88 is driven by means of a chart drive motor 172 in the conventional manner with the rotational speed of the drum being relatively slow, say on the order of 1 r.p.m. As previously stated, the drum 170 is suitably connected by a linkage 21 through a drive system 31 for imparting rotation to the turntables 28, 30 for rotating the gratings 20, 22, respectively, in unison. The range of rotation of the gratings 20, 22 is coordinated with the rotation of the drum in such a way that the gratings will permit complete scanning of the spectrum being utilized for each revolution of the drum.

Means are provided for maintaining the reference pulse signal at a constant height for all wave lengths and to this end there is utilized a circuit for comparing the reference pulse signal height with a generated pulse signal height, detecting the height difference and controlling the high voltage supplied to the photomultiplier 50 in accordance with this height difference. By maintaining the reference pulse signal equal to the generated pulse signal, the high voltage supply is varied in a direction to alter the photomultiplier sensitivity.

As shown in FIG. 1, a pulse generator 178 for generating a standard pulse signal is connected to a pulse difference detector 180 which detects the difference between the generated standard signal and the reference signal from the signal separator 80. The new signal which is indicative of this difference is utilized by a voltage regulator 182 to control the output of a high voltage supply 184 for the photomultiplier 50.

Details of the pulse generator 178 are indicated in FIG. 4 wherein a full wave rectifier 186 is shown as receiving its voltage supply from the ends 188, 189 of the secondary coil 190 of a center-tap transformer 192 the primary coil of which is connected to a suitable source 194 of 60 cycles voltage. The negative D.C. output of the full wave rectifier 186 is applied across a voltage divider comprising resistors 196, 198 the latter resistor being connected to the center-tap 200 of the transformer which is at ground potential. The negative output of the rectifier 186 charges a capacitor 202, connected between the center tap 200 and the resistor 196, to the peak value of the secondary voltage. The arrangement of the resistors is such as to develop 0.707 of the negative voltage on the capacitor 202 at the juncture 204. A diode 206, having its anode connected to the juncture 204 and the end 189 of the secondary coil 190, can only conduct when the voltage developed across the secondary coil 190 between the end 189 and the center tap 200 exceeds 0.707 of the peak secondary voltage during the negative half cycle.

The effect of this conduction of the diode 206 is to render more negative the voltage for 90° at the juncture 204 during the negative half cycle and is coupled to the grid 208 of an amplifier tube 210, the grid being connected to a coupling capacitor 209 connected to the juncture 204. The pulse on the grid 208 is a constant 90° in width and the peak is coincident with the negative peak of the secondary coil 190 between the tap 200 and the end 189. In FIG. 5, wave form F illustrates the input voltage E max. between the cathodes of the rectifier 186 and as such, will be considered as maximum voltage entering the circuit. Wave form G illustrates the voltage between the cathode and plate of the diode 206 and the portions of the negative peaks which exceed 0.707 of the peak voltage E max. Wave form H illustrates the voltage developed at the grid 208 and, it will be noted, includes negative peaks of small amplitude and which are in coincidence or phase with the negative peaks of the input voltage E max.

Amplification of the signal on the grid 208 takes place in the tube 210 which also produces clipping since the same is designed to be driven below cutoff. The output pulse signal from the plate of the tube 210 is coupled to the grid 212 of a cathode follower 214 through a resistor 216. The resistance of the resistor 216 is made to develop a high source impedance for the cathode follower 214 which is then adapted to produce a positive grid current-clipping of the pulse signal in order to shape it into a positive square pulse of constant amplitude, indicated as wave form J in FIG. 5. A resistance element 218 of a potentiometer 220 is connected between the cathode of the tube 214 and the center tap 200 of the transformer secondary coil 190. Output of the pulse generator 178 having the wave form J in FIG. 5 is controlled by the position of the slider 222 upon the element 218 and is conducted to the pulse difference detector 180 by a conductor 224 connected to the slider.

As previously stated, the reference pulse signal is conducted to the linear potentiometer 82 by the conductor 148 after it is separated by the chopper 132. This reference pulse signal is a negative signal and serves to charge a capacitor 226 of the pulse difference detector 180 through a conductor 228 connected to the conductor 148 and a resistor 230 connected to the capacitor 226. The positive pulse from the pulse generator 178 also charges the capacitor 226 through the conductor 224 and a resistor 232 connected to the same side of the capacitor as is the resistor 230. The other side of the capacitor 226 is connected to the ground lead 234 of the high voltage regulator 182 which is provided with a synchronous filter in the form of a chopper 236 having a stationary contact 238 connected through a resistor 240 to the side of the capacitor 226 to which the resistors 230, 232 are connected. Another stationary contact 242 of the chopper is connected to the ground lead 234 through a resistor 244 and also to the contact 238 through a capacitor 246 which has a capacitance value much smaller than the capacitor 226 and with resistor 244 has a time constant much greater than the period of the chopper 236. A movable switch element 248, which is movable alternately between the contacts 238, 242 at a frequency of 60 cycles a second or equal to line voltage frequency, is connected to the ground lead through a resistor 250. To complete the structure of the synchronous filter, the contact 242 is connected to a capacitor 251 which in turn is connected to the grid 252 of an amplifier tube 254.

Charging of the capacitor 226 by the negative reference pulse and the positive pulse from the pulse generator 178 occurs simultaneously when the switch element 248 and the contact 242 are closed. In this condition of the chopper, the capacitor 246 is also charged through the resistors 230, 240 by the reference pulse, indicated as curve C in FIG. 5, and through the resistors 232, 240 by the pulse from the pulse generator, indicated as curve J. The capacitor 226 is brought to a D.C. level proportional to the difference in pulse heights of the signals charging the same since one signal is positive while the other is negative. Since the capacitance value of the capacitor 246 is much smaller than the capacitor 226, the D.C. voltage on the capacitor 246 is essentially the same as the voltage on the capacitor 226.

When the switch element 248 moves in closed position with respect to the contact 238, the capacitor 226 is discharged while the voltage across the capacitor 246 remains essentially constant since the time constant of its discharge path is much greater than the period of the chopper. Under this condition, the voltage presented at the grid 252 of an amplifier tube 254 is a square wave having an amplitude proportional to the difference in pulse heights and phase shifted 180° with respect to the input pulses, as will be presently described.

The following electrical components with the parameters indicated have been utilized for the above-described circuit and are shown merely as an illustration of the operation of this circuit:

| | | |
|---|---|---|
| Resistor 230 | megohms | .56 |
| Resistor 232 | do | .56 |
| Resistor 240 | ohms | 5600 |
| Resistor 244 | megohms | 4.7 |
| Resistor 250 | ohms | 330 |
| Capacitor 226 | mfd | .25 |
| Capacitor 246 | mfd | .02 |
| Capacitor 251 | mfd | .1 |

The cycling curve for the chopper 236 is indicated at K in FIG. 5 and for the first half $K_1$ of a full cycle of operation, the switch element 248 is in closed relation with respect to the contact 242 and for the second half $K_2$ of the cycle, the switch element is in closed relation with respect to the contact 238. The curve L illustrates the signal developed on the grid 252 and its amplitude is proportional to the difference in the absolute values of the amplitudes of the reference and pulse generator signals. With the switch element 248 in engagement with the contact 242, both capacitors 226 and 246 are charged by the input signals C and J. Since the ohmic value of the resistor 250 is very low compared to the ohmic value of the resistor 244, the voltage on the grid 252 is nearly, or for all practical purposes, zero. See the condition of curve L for the first 180° of a full cycle.

When the switch element 248 is in engagement with the contact 238, with no input pulses entering the circuit, the resistor 250 is effectively placed in parallel with the capacitor 226 and since the ohmic values of the resistors 240 and 250 are low, the capacitor 226 discharges toward zero through these resistors to the ground 234. The charge on the capacitor 246 then appears on the grid 252 as shown in the second half of a full cycle of curve L. This signal on the grid is proportional to the difference in pulse heights and phase shifted 180° with respect to the input pulses. The discharge of this capacitor is very slight, and, actually, the charge thereon remains relatively constant except for the slight discharge during this portion of the cycle. This will be understood when it is noted that with the switch element 248 against the contact 238, the discharge of the capacitor 246 would have to be through the resistors 250 and 244 and with the latter resistor being very high in ohmic value, discharge is impeded. As a filtering action, when the element 248 is against the contact 238, the portion of the circuit before the chopper is completely isolated from the circuit after the chopper and consequently noise is prevented from influencing the input to the grid 252.

The signal developed on the grid may be either in phase or 180° from line voltage depending upon whether the absolute value of the reference pulse height or amplitude is lesser or greater than the absolute value of the pulse generator pulse height. Actually, the amplitude of the pulse generator signal does not change and when the absolute value thereof is greater than the absolute value of the reference pulse signal, the signal on the grid will be 180° out of phase with line voltage. On the other hand, if the height of the pulse generator pulse is less than the height of the reference pulse, the signal on the grid will be in phase with line voltage. For purpose of illustration, the above discussion was based on the height of the reference pulse being less than the height of the pulse generator pulse, thus the signal on the grid, as illustrated by the curve L, is 180° out of phase with line voltage. See curve B.

The amplifier 254 has its plate 256 RC coupled to the grid 258 of another amplifier tube 260 which in turn has its plate 262 RC coupled to the grid 264 of a tube 266. The tube 266 serves as one leg of a bridge integrator circuit generally indicated by the reference numeral 268 which also includes another tube 270 and both portions of a center-tapped secondary coil 272 of a transformer 274 as the other legs of the bridge. Excitation voltage of 60 cycles for the bridge is supplied across the secondary coil 272 by a primary coil 276 having its lead conductors 278 connected to the ends 188, 189 of the secondary coil 190. The output of the bridge is taken across a capacitor 280 connected between the center tap 282 of the secondary coil 272 and a conductor 284 which connects the cathode of the tube 266 and the plate of the tube 270.

Conduction of the tubes 266 and 270 can only occur during the positive half-cycle of the excitation voltage. The amplitude of the square wave signal from the plate 262 of the tube 260 which is coupled to the grid 264 of the tube 266 determines the amount of conduction through the latter, this input signal being in phase or 180° out of phase with the excitation voltage depending upon the phase of the signal or grid 252. On the other hand, the amount of conduction through the tube 270 is not influenced by the square wave signal, and merely serves as the inactive element in the bridge circuit 268. This results from the coupling of the grid of tube 270 to the cathode through resistor 289.

The difference in plate current flowing between the tube 266 and the tube 270 establishes a current into the capacitor 280 for charging the same during the positive half-cycle. During the negative half-cycle, the tube 266 is cut off, that is, is in a non-conducting condition, resulting in the simultaneous cut off of the tube 270 since the plates of the tubes 266, 270 are negative with respect to their respective cathodes. The voltage across the capacitor 280 is retained since there is no discharge path through the tubes while cut off. During the next positive half-cycle, the capacitor 280 is charged to a new D.C. level determined by the amplitude of the square wave on the grid 264 of the tube 266. The capacitor 280 and the resistor 281 are chosen to have a large charging time constant compared to the period of one cycle of the frequency of the primary coil 276 or line voltage so that the voltage across the capacitor varies slowly with the signal on the grid 264. In effect then, the D.C. level on the capacitor 280 is relatively constant being proportional to the height of the input signal to the grid 264 of the tube 266. The resulting D.C. output from the bridge integrator circuit 268 and taken across the capacitor 280 is supplied to the output circuit 290 of the high voltage regulator as will be presently described.

The high voltage supply circuit 184 for the photomultiplier 50 includes a power transformer 292 having its primary coil 294 connected to a suitable source of 60 cycle voltage and a secondary coil 296 connected to a pair of half-wave rectifiers 298, 300 to form a standard full-wave rectifier circuit.

The full-wave rectified output is filtered by a pi section network consisting of a resistor 302 and two capacitors 304, 306 and is adapted to be conducted to the photomultiplier 50 by a conductor 308. Control of the amount of this output to be thus conducted is achieved by the conducting condition of a series control tube 310 which has its plate 312 connected to the center tap 314 of the secondary coil 296, its cathode 316 connected to the ground lead 234, and its grid 318 connected by a conductor 319 to one side of the capacitor 280 of the bridge circuit 268. The voltage drop from the plate 312 to the cathode 316 varies in accordance with the voltage applied to the grid 318, such voltage being indicative of the pulse height difference between the reference pulse signal and the pulse signal generated by the pulse generator 228. A capacitor 320 is connected between the grid 318 and the conductor 308 in order to provide additional filtering by coupling the remaining ripple voltage in the output of the high voltage supply circuit 184 to the grid 318. With this arrangement, the power supply output can be varied from about −250 D.C. to −1150 D.C., depending upon the response of the photomultiplier at a particular wave length.

In the event the amplitude or height of the reference pulse signal has deviated from its constant value, the reference pulse is compared with a pulse from the pulse generator in the difference detection circuit 180, and a chopped D.C. voltage proportional to the difference in pulse height is obtained. The chopped or square wave signal is then amplified and converted to a D.C. voltage by the bridge integrator circuit 268 that provides a bias voltage for the control grid 318 of the series control tube 310. The high voltage supply output is thus caused to vary in a direction to maintain the difference between the reference pulses and the pulses from the pulse generator equal to zero.

From the foregoing description, it will be apparent that the present invention provides means for producing ratio measurement indicative of the absorption characteristics of a sample specimen when compared to the absorption characteristics of a reference specimen. It will be appreciated that the means for producing this signal utilizes separate channels each of which receives the identical signal generated at the photomultiplier so that separation of the one of the two components of the generated signal of the photomultiplier from one of the channels has no effect on the signal in the other channel. In this manner, noise and cross talk are prevented from influencing the error signal. Another circuit is provided for maintaining the pulse height of the reference signal constant in order to assure a correct comparison of the sample and reference signals, thus eliminating the need for moving optical parts interposed in the reference beam.

I claim:

1. In a spectrophotometer having means for producing a series of radiation pulses indicative of a sample specimen the optical characteristics of which are under study and a series of radiation pulses indicative of a reference specimen and means for directing the two series of radiation pulses in alternate sequence upon a radiation detector which is adapted to produce a composite electrical signal having component signals proportional to the respective series of radiation pulses impinging thereon, the combination of an amplifier amplifying the composite signal, a pair of identical channels connected in parallel to the output of said amplifier whereby each of said channels receives alternate pulses of said composite signal and includes, filtering means eliminating one of the component signals of said composite signal from the output circuit of one of said channels and the other component signal of said composite signal from the output circuit of the other of said channels in alternate sequence, an impedance element coupled between the output circuits of said channels producing a resultant signal indicative of the difference in amplitude in the components of the composite signal, means recording a signal in response to the difference in amplitudes of said components, a standard pulse generator generating a standard pulse signal, a detector circuit coupled to said standard pulse generator and the output circuit of a selected one of said channels producing a control voltage and applying the voltage to said amplifier for controlling the amplification at said amplifier to maintain one of said component signals at a substantially constant value despite variations in sensitivity of said amplifier circuit.

2. A double beam spectrophotometer comprising, means producing two condition responsive radiation signals, electrical signal producing means producing two electrical signals responsive respectively to said radiation signals, comparator means comparing said electrical signals and producing an output adapted for recording and indicating the ratio between the respective values of the two electrical signals, a standard signal generator producing a standard electrical signal, electric control means comparing the standard electrical signal with a selected one of said condition responsive electrical signals and producing a difference signal, means applying the difference signal to said electrical signal producing means for maintaining the value of the selected one of said electrical signals substantially constant despite variations in the intensity of radiation signals.

3. A double beam spectrophotometer comprising, means producing two condition responsive radiation signals, electrical signal producing means producing two electrical signals responsive respectively to said radiation signals, comparator means comparing said electrical signals and producing an output indicating the ratio between the respective values of the electrical signals, means recording the ratio between the electrical signals, a standard signal generator generating a standard signal, a voltage difference detector circuit associated with said signal generator and said comparator means and connected through feedback means to said electrical signal producing means for simultaneously controlling the value of said electrical signals responsive to the radiation signals despite variations in the radiation signals and sensitivity of said electrical signal producing means to said radiaton signals.

4. A double beam spectrophotometer comprising, signal producing means producing a reference and a test electrical signal responsive respectively to a reference condition and to a test condition being investigated, common amplifying means amplifying the reference and test signals, circuit means sensing and recording the ratio between said reference and test electrical signals, a standard signal generator generating a standard signal, a difference detection circuit coupled to said standard signal generator and said electrical signal producing means for detecting a difference signal between the standard signal and the reference signal, a feedback circuit connected to said difference detection circuit and said amplifying means to control the amplification of said amplifying means in response to the difference signal detected by said detector.

5. A double beam spectrophotometer comprising, means producing time spaced radiation pulses alternate ones of which are responsive respectively to a reference condition and to a test condition, electrical signal producing means sensing said radiation pulses and producing a composite electrical signal in response thereto and including time spaced electrical pulses alternate ones of which are responsive respectively to said alternate ones of said radiation pulses, circuit means comparing and recording a signal responsive to the difference between alternate of said electrical pulses, a standard signal generator generating a standard pulse signal, a regulating voltage means connected to said standard signal generator said circuit means and said electrical signal producing means sensing a difference signal between the standard pulses and the electrical pulses responsive to a reference condition and maintaining a substantially constant magnitude of the alternate pulses of said composite electrical signal which are responsive to the reference condition through feedback means controlling the sensitivity of said electrical signal producing means.

6. A double beam spectrophotometer comprising, means producing time spaced radiation pulses alternate ones of which are responsive respectively to a reference condition and a test condition, electrical signal producing means including a variable gain circuit sensing said radiation pulses and producing a composite electrical signal responsive to said radiation pulses, comparator means indicating a ratio between alternate pulses of said composite signal, a standard electrical pulse generator generating a standard pulse signal, a voltage control means coupled to said electrical signal producing means, said standard pulse signal generator and said comparator means applying a voltage to said variable gain circuit responsive to the difference in magnitude between ones of said electrical pulses which are responsive to the reference condition and the pulses of said standard pulse signal to maintain all of said reference condition responsive electrical pulses at a substantially uniform magnitude and simultaneously to proportionately control the magnitude of those of said electrical pulses that are responsive to the test condition.

References Cited in the file of this patent

UNITED STATES PATENTS

| | | |
|---|---|---|
| 2,412,423 | Rajchman et al. | Dec. 10, 1946 |
| 2,474,098 | Dimmick | June 21, 1949 |
| 2,621,298 | Wild et al. | Dec. 9, 1952 |
| 2,680,989 | Savitzky et al. | June 15, 1954 |
| 2,709,943 | Frommer | June 7, 1955 |
| 2,761,350 | Hornig | Sept. 4, 1956 |
| 2,850,644 | Parsons | Sept. 2, 1958 |
| 2,879,393 | Cary et al. | Mar. 24, 1959 |
| 2,900,866 | Coates et al. | Aug. 25, 1959 |